United States Patent [19]

White et al.

[11] Patent Number: 5,318,315
[45] Date of Patent: Jun. 7, 1994

[54] PORTABLE WHEELED CART FOR WORK IN YARD AND GARDEN

[75] Inventors: Adam N. White, Cary; David S. Chapin, Raleigh, both of N.C.; David L. McRorie, Dallas, Tex.

[73] Assignee: H&M Lawn Caddy Corporation, Dallas, Tex.

[21] Appl. No.: 940,233

[22] Filed: Sep. 3, 1992

[51] Int. Cl.⁵ .............................................. B62B 1/10
[52] U.S. Cl. ............................ 280/47.26; 280/47.33; 280/47.18
[58] Field of Search ............... 280/47.17, 47.18, 47.19, 280/47.24, 47.26, 47.34, 47.35, 47.36, 651, 652, 654, 655, 655.1, 47.33

[56] References Cited

U.S. PATENT DOCUMENTS

| | | | |
|---|---|---|---|
| 4,281,843 | 8/1981 | Johnson et al. | 280/47.26 |
| 4,350,366 | 9/1982 | Helms | 280/47.26 |
| 5,159,777 | 11/1992 | Gonzalez | 280/47.26 |
| 5,213,351 | 5/1993 | Chen | 280/47.26 |

FOREIGN PATENT DOCUMENTS 2133977 8/1984 United Kingdom ............. 280/47.26

Primary Examiner—Richard M. Camby
Attorney, Agent, or Firm—Bell, Seltzer, Park & Gibson

[57] ABSTRACT

A portable wheeled cart for work in yard and garden includes a body having a bottom wall and a pair of opposing sidewalls extending upwardly from the bottom wall. The sidewalls include a plurality of open-ended passageways defined therein for receiving handles of yard tools. In the wheelbarrow position, the yard tools and supplies can be readily transported from one location to another without requiring repeated trips between locations. Moreover, for storing yard and garden supplies and tools, the cart can be rotated into an upright position about the wheel means, wherein the yard tools can be stored and wherein the front and rear walls of the wheelbarrow form shelves for holding lawn and garden supplies.

19 Claims, 5 Drawing Sheets

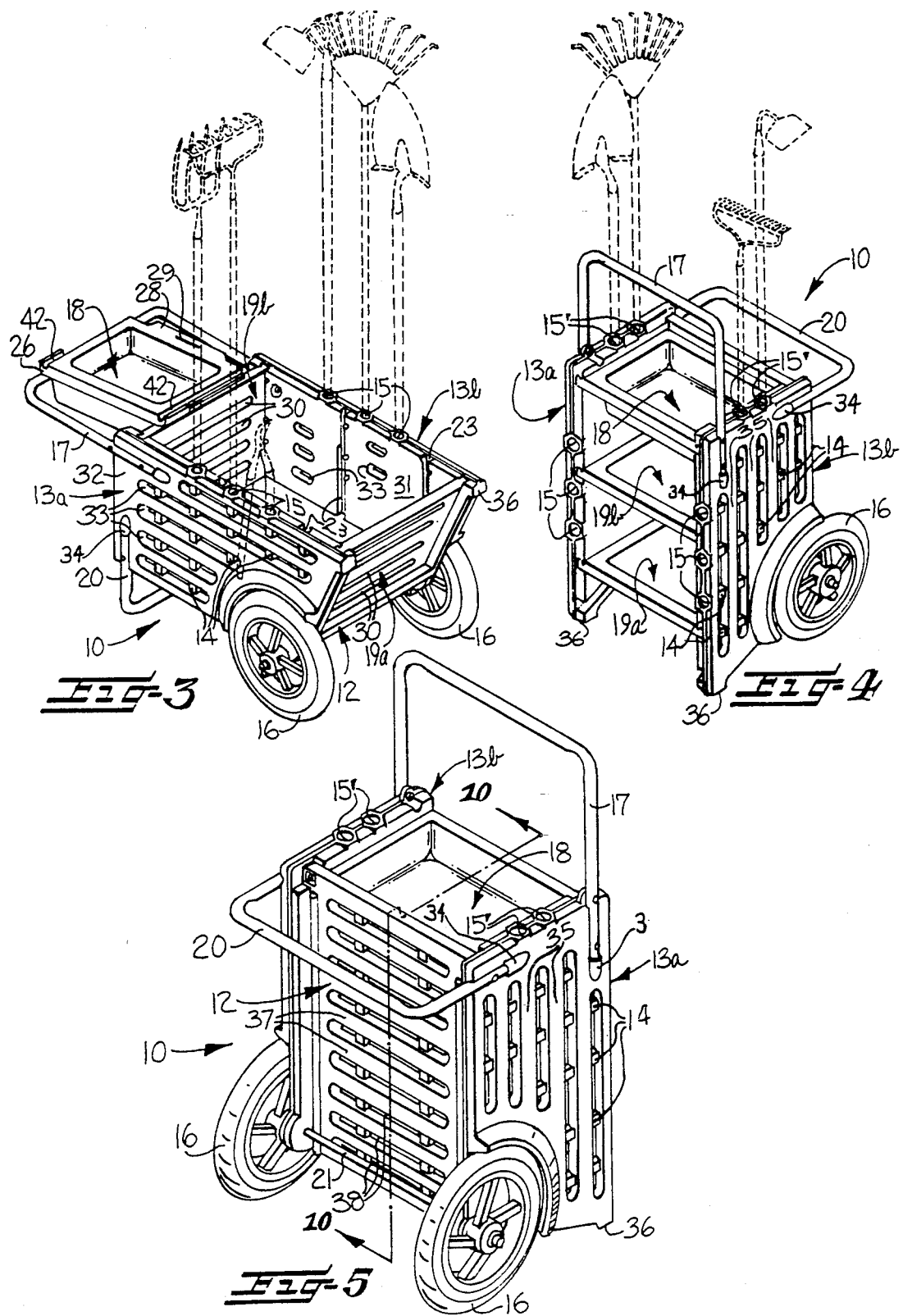

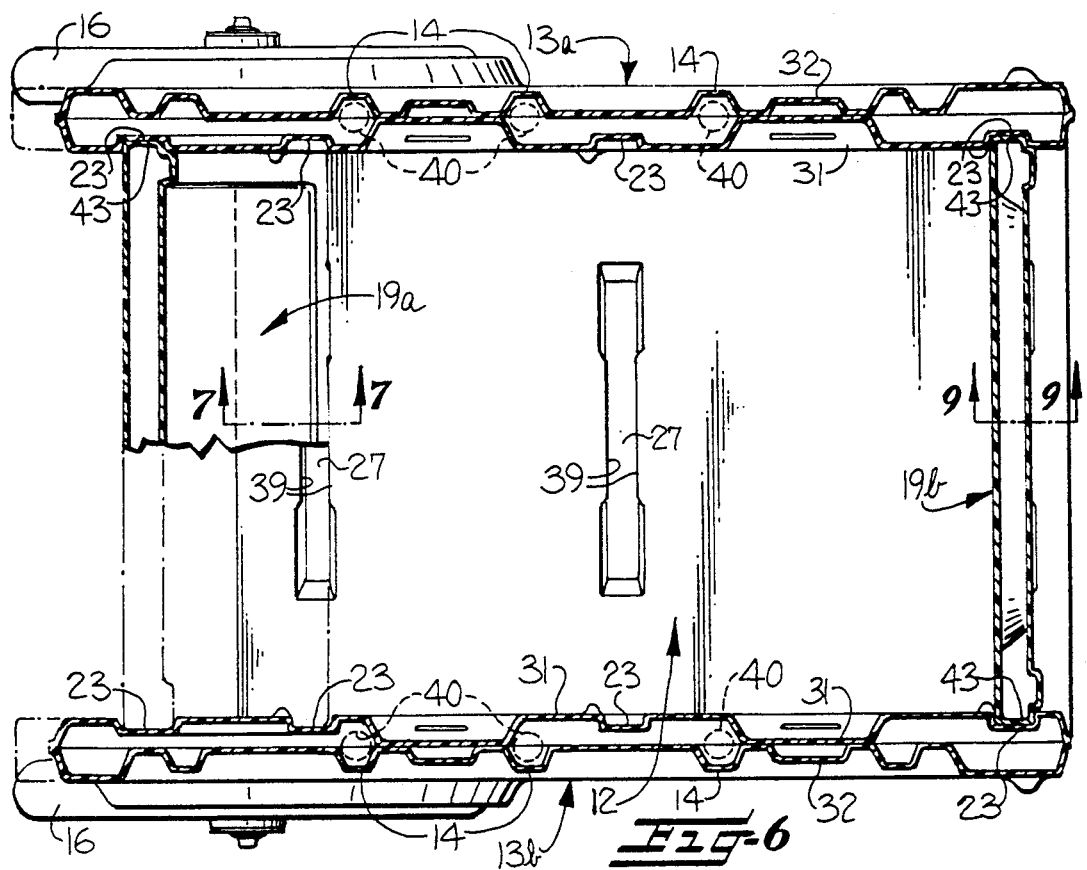
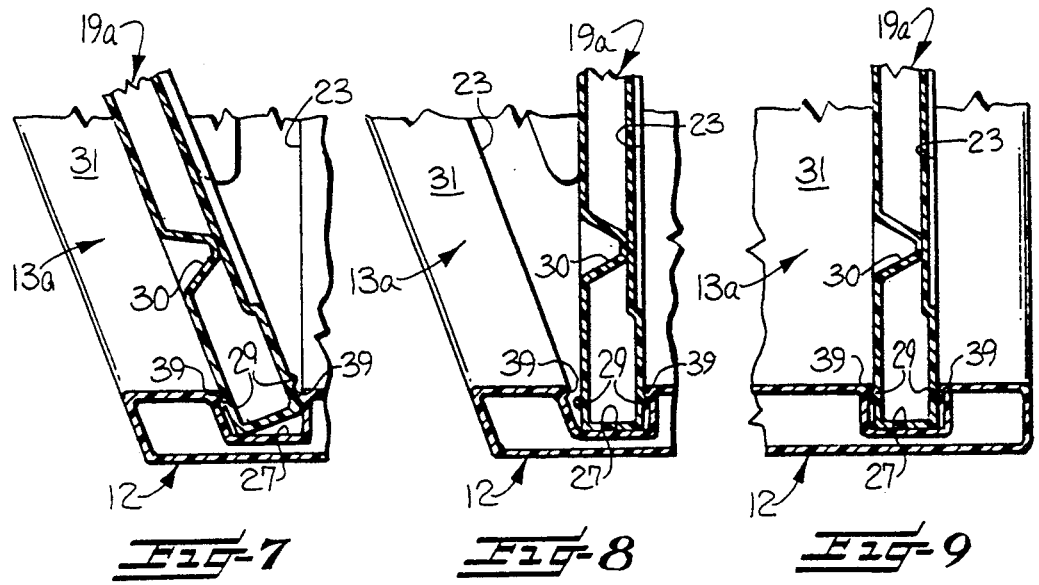

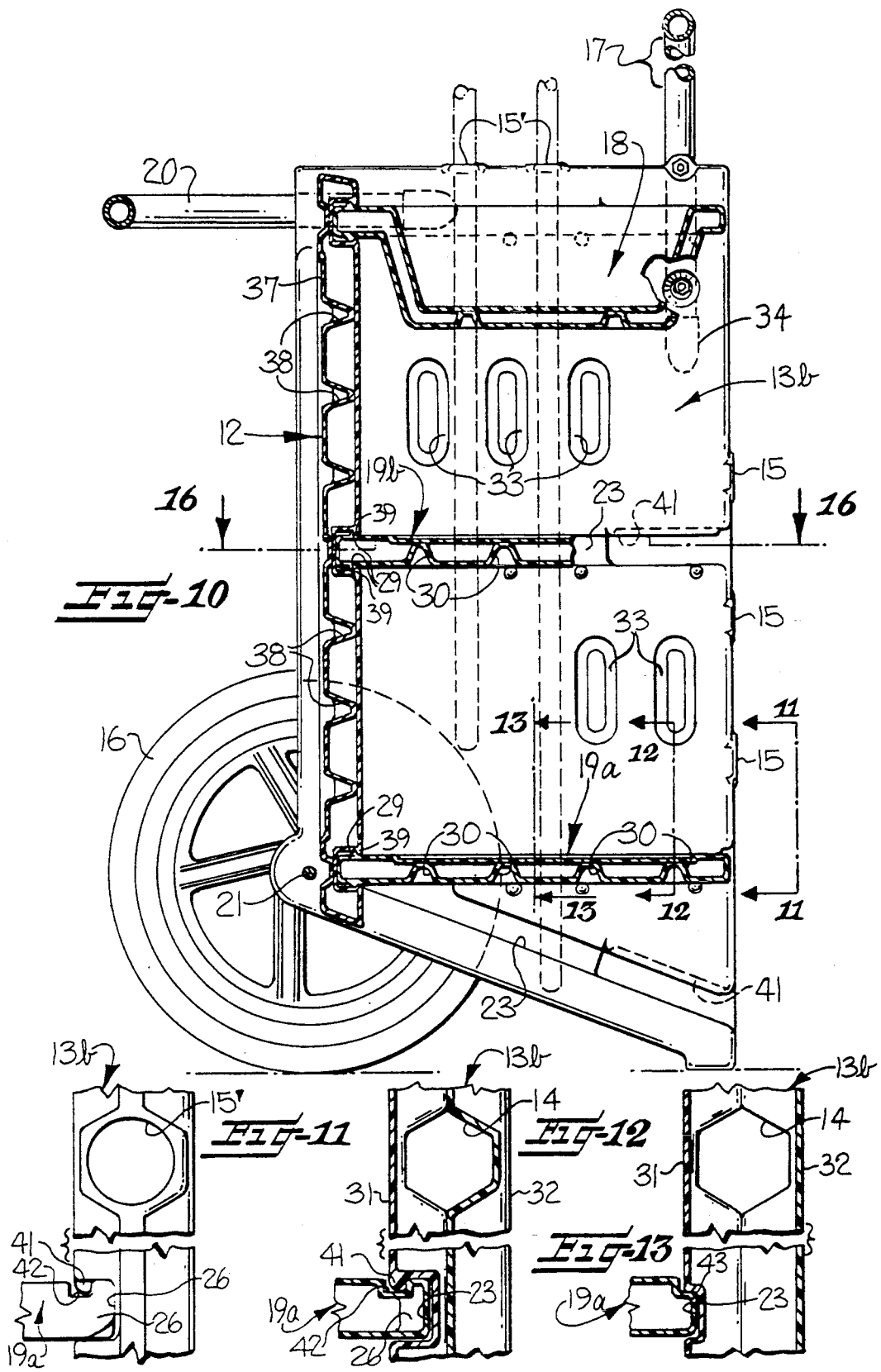

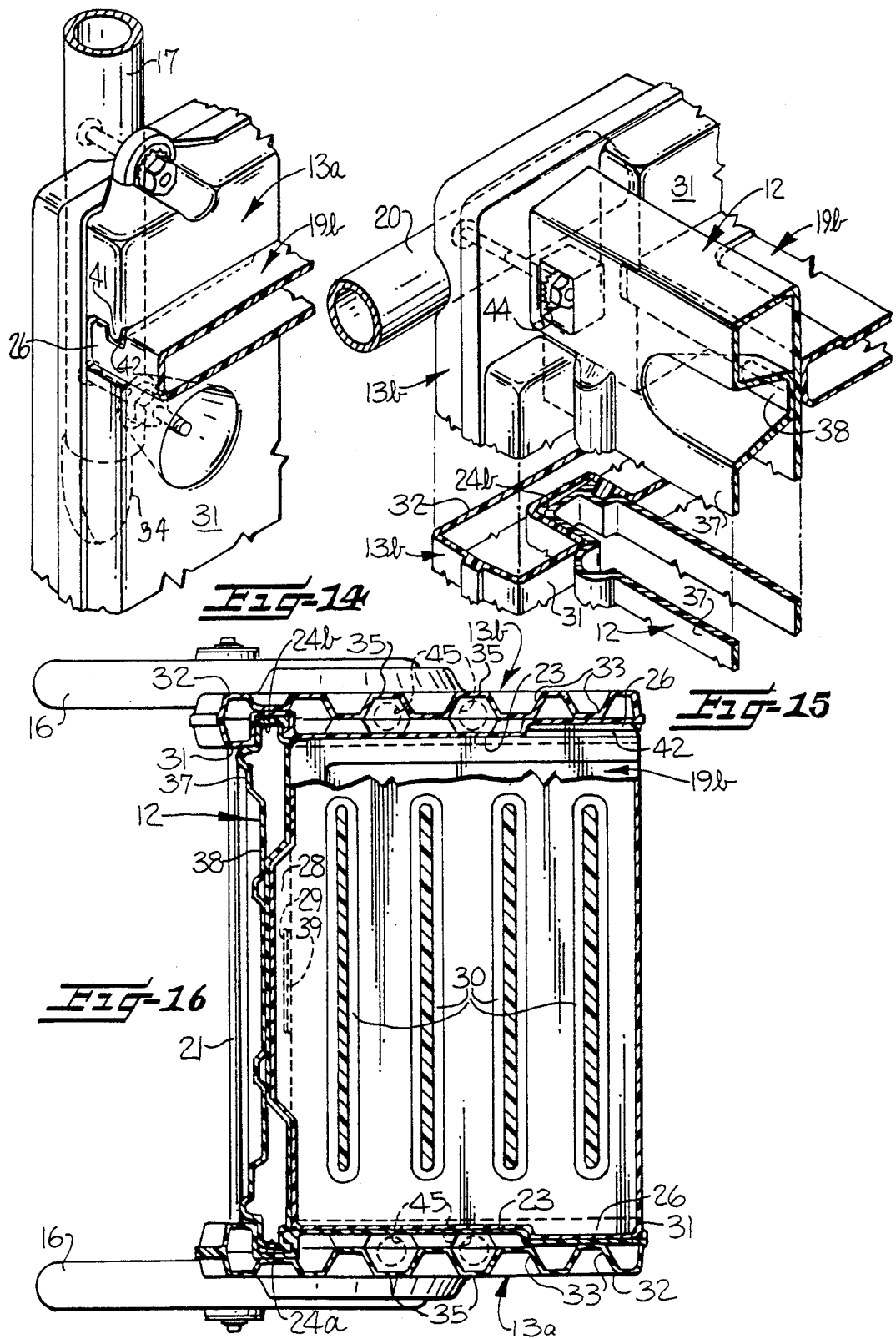

PORTABLE WHEELED CART FOR WORK IN YARD AND GARDEN

FIELD OF THE INVENTION

This invention relates to portable carts for transporting lawn and garden supplies, including yard tools, and for providing temporary storage of same.

BACKGROUND OF THE INVENTION

Portable wheeled carts for use in lawn and garden work are commonly used by both commercial and home users. However, the home user is likely to choose a less expensive and lower quality brand name as compared to his or her commercial counterpart who is more likely to need a portable cart for conveying relatively heavy loads on a frequent basis and who requires sustained durability lasting many years. The home user who typically performs lawn nd garden work only on weekends, on the other hand, is generally willing to opt for a non-commercial model if sufficient savings in cost can be achieved. However, concomitant with the cost savings is a general reduction in the durability and functionality of the cart. Moreover, unlike the commercial user, the home user may not have separate facilities or carts for storing various lawn and garden supplies and tools in an efficient manner during non-use periods. Accordingly, the home user's yard and garden supplies and tools are typically stored in the garage with other household items and may often become misplaced during extended periods of non-use, thus causing frustration to the homeowner seeking to resume work about the house. In addition, due to the relatively limited capacity of most lawn and garden carts, the user frequently makes repeated back-and-forth trips between the place of work and storage area to acquire all the supplies needed for the particular job to be performed. Furthermore, when lawn carts such as conventional wheelbarrows are not being used, they provide no secondary function such as the capability of efficiently storing lawn and garden supplies.

SUMMARY OF THE INVENTION

It is therefore an object of the present invention to provide a portable wheeled cart for yard and garden work having low cost but substantial durability for use over many years.

It is another object of the present invention to provide a portable wheeled cart capable of simultaneously conveying both lawn and garden supplies and yard tools having elongate handles in either an upright or downright position.

It is still another object of the present invention to provide a cart for efficiently storing both lawn and garden supplies and tools during periods of non-use, while occupying a relatively minimal amount of lateral space.

These and other objects are provided, according to the present invention, by a portable wheeled cart for conveying lawn and garden supplies and tools for work around the house and landscape and storing same in the cart during periods of non-use.

In particular, the portable wheeled cart of the present invention includes a body having a bottom wall and a pair of opposing sidewalls. The sidewalls include a plurality of open-ended passageways defined therein for receiving handles of yard tools to facilitate carrying and storing same in the cart during periods of use and non-use, respectively. The cart further includes a handle and wheel means connected to the body for permitting the grasping and rolling movement of the cart about the yard and garden.

The inner faces of the sidewalls are further defined to include a series of spaced-apart pairs of opposing generally vertically arranged grooves integrally defined therein. Each pair of opposing grooves is designed to provide for the slidable connection of interchangeable connecting walls or trays in the cart. For carrying large sized loads, however, the connecting walls can be readily removed or moved to the forwardmost and rearmost positions to form a wheelbarrow wherein the forwardmost wall projects forwardly and upwardly from the body of the cart to thereby facilitate the dumping and spreading of lawn and garden supplies such as peat moss, fertilizer, top soil, etc. To support the body of the cart in the wheelbarrow position, a rear rest support connected to and extending downwardly from the body is provided. The combination of the rear rest support and wheel means maintain the bottom wall of the cart in a generally horizontal plane with respect to the ground.

According to one aspect of the present invention, the plurality of open-ended passageways includes a first plurality of passageways with access openings along the uppermost edges of the sidewalls and a second plurality of passageways with access openings along the rearmost edges of the sidewalls. The first plurality of passageways are designed to receive elongate handles of yard tools for carrying same about the yard and garden during use. Alternatively, when the cart is converted to an upright position, the second plurality of passageways are designed to receive elongate handles of yard tools and provide storage of same. The cart can be converted to an upright position by grasping the handle and providing upward force thereto to thereby rotate the body about the wheel means. In the upright position, portions of the forwardmost edges of the body engage the ground; in the upright position the connecting walls also serve as shelves for holding and storing yard and garden supplies.

According to another aspect of the present invention, the sidewalls are formed of double-walled integrally molded plastic having inner and outer wall portions. Preferably, the inner and outer wall portions of the sidewalls include relatively short segments recessed inwardly towards each other for providing rigidity and added strength to each of the sidewalls. The recessed segments may also be configured so as to define the first and second plurality of passageways which preferably have longitudinal axes in substantially orthogonal relation to each other and extend between the inner wall and outer wall portions of the double-walled sidewalls. The entire body including the bottom and connecting walls may also be formed of double-walled plastic.

The connecting walls may also include tongue members along their bottommost edge to be matingly received in respective spaced-apart grooves in the bottom wall. Both the spaced-apart grooves and tongue members preferably include cooperating portions for releasably locking each connecting wall or tray in its respective pair of opposing grooves in the absence of an upwardly directed force being applied thereto. These cooperating portions typically include raised ribs adjacent the edges of the tongue members and adjacent the edges of the spaced-apart grooves.

According to still another aspect of the present invention, the forwardmost spaced-apart groove is adapted to matingly receive the tongue member of a connecting wall positioned in either the forwardmost or next forwardmost pair of opposing grooves. Preferably, the forwardmost pair of opposing grooves extends forwardly and upwardly at an angle diverging from the next forwardmost pair of opposing grooves to thereby receive a forwardly and upwardly sloping front wall.

BRIEF DESCRIPTION OF THE DRAWINGS

Other features of the invention will be apparent from the following description of an illustrative embodiment thereof, which should be read in conjunction with the accompanying drawing, in which:

FIG. 3 is left front perspective view of the present invention environmentally illustrating the ease of transporting lawn and garden tools wherein elongate handles of yard tools (dotted lines) are received in a first plurality of sidewall passageways;

FIG. 4 is a right perspective view of the portable wheeled cart in the upright position wherein elongate handles of yard tools (dotted lines) are shown received in a second plurality of sidewall passageways;

FIG. 5 is a rear perspective view of the portable wheeled cart in the upright position;

FIG. 6 is a horizontal sectional view of the portable wheeled cart taken along line 6—6 shown in FIG. 1;

FIG. 7 is a fragmented vertical sectional view taken along line 7—7 of FIG. 6, showing the double-walled construction of the bottom wall and connecting wall, wherein the connecting wall is in the forwardmost pair of opposing sidewall grooves;

FIG. 8 is a fragmented vertical sectional view similar to FIG. 7 showing the double-walled construction of the bottom wall and connecting wall, wherein the connecting wall is in the second forwardmost pair of opposing sidewall grooves;

FIG. 9 is a fragmented vertical sectional view taken along line 9—9 of FIG. 6 showing the double-walled construction of the bottom wall and connecting wall, wherein the connecting wall is in the rearmost pair of opposing grooves;

FIG. 10 is a vertical sectional view of the cart in an upright position taken along line 10—10 of FIG. 5, showing the double-walled construction of the bottom wall, connecting walls arranged in the lowermost shelf positions and tray arranged in the uppermost shelf position;

FIGS. 11–13 illustrate the slidable connection between the sidewall and a connecting wall taken along lines 11—11, 12—12, and 13—13 of FIG. 10 at various points along one of the sidewall grooves;

FIG. 14 is a fragmented view of the connection between the handle and sidewall;

FIG. 15 is a fragmented view of the connection between the bottom wall, sidewall and connecting wall; and FIG. 16 is a horizontal sectional view of the portable wheeled cart in the upright position, taken along line 16—16 in FIG. 10.

DESCRIPTION OF A PREFERRED EMBODIMENT

Figure 1:
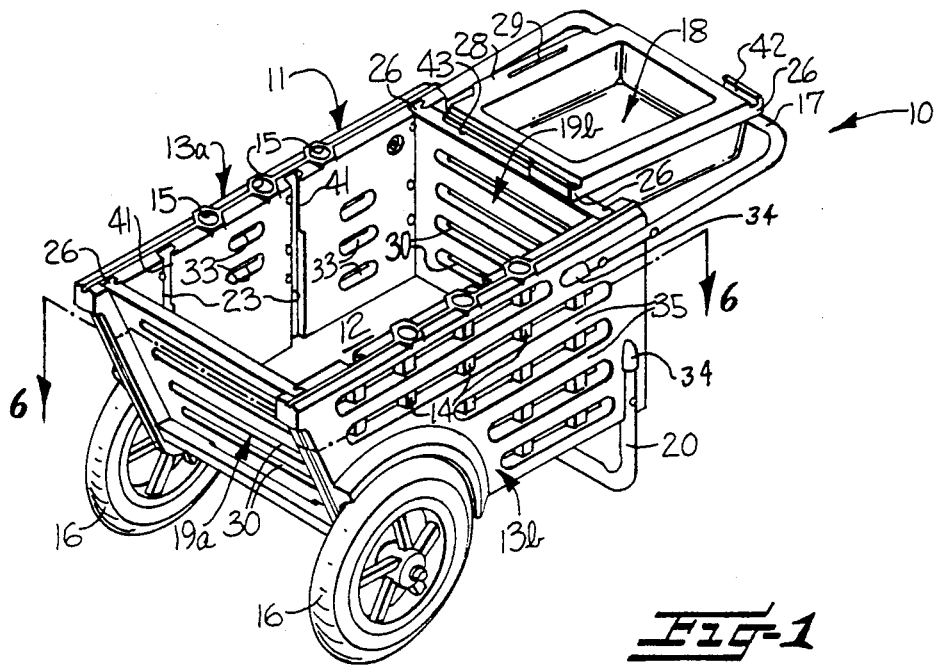
FIG. 1 is a right front perspective view of the portable wheeled cart in accordance with the present invention.

The present invention will now be described more fully hereinafter with reference to the accompanying drawings, in which a preferred embodiment of the invention is shown. This invention may, however, be embodied in many different forms and should not be construed as limited to the embodiment set forth herein; rather, this embodiment is provided so that this disclosure will be thorough and complete, and will fully convey the scope of the invention to those skilled in the art. Like numbers refer to like elements throughout.

Referring now to a front perspective view of the portable wheeled cart 10 shown in FIG. 1, the present invention will be described. The cart 10 comprises a body 11 having a bottom wall 12 and a pair of opposing sidewalls 13a, 13b extending upwardly from the bottom wall 12. The sidewalls 13a, 13b have a first plurality of open-ended passageways 14 defined therein for receiving handles of yard tools, not shown, and facilitating the carrying of the yard tools in the cart 10. The open-ended passageways are defined within the sidewalls 13a, 13b but, for illustration purposes only, are designated externally by reference numeral 14. The open-ended passageways 14 preferably have single access openings 15 along the uppermost edges of the respective sidewalls 13a, 13b and access openings 15' along the rearmost edges. Wheel means, including two wheels 16, is also connected to the body 11 for permitting the rolling movement of the cart 10 about the yard and garden. A handle 17 connected to the body 11 for facilitating the grasping and moving of the cart 10 is also shown.

Also provided are forwardmost and rearmost connecting walls 19a, 19b, respectively, for defining the region wherein fungible and other lawn and garden supplies can be contained without spillage. Preferably, the rearmost wall 19b and handle 17 are suitably oriented to receive a tray 18 thereon, as shown; in this position, the tray is can be used to carry additional garden supplies and tools. The tray 18 is preferably designed to be readily substituted for the frontmost wall 19a to provide even greater transport capability to the cart 10. A ground engaging rear rest support 20 is also connected to the body 11 and extends downwardly therefrom. In cooperation with the wheel means, the rear rest support 20 maintains the bottom wall 12 in a substantially horizontal plane with respect to the ground.

Figure 2:
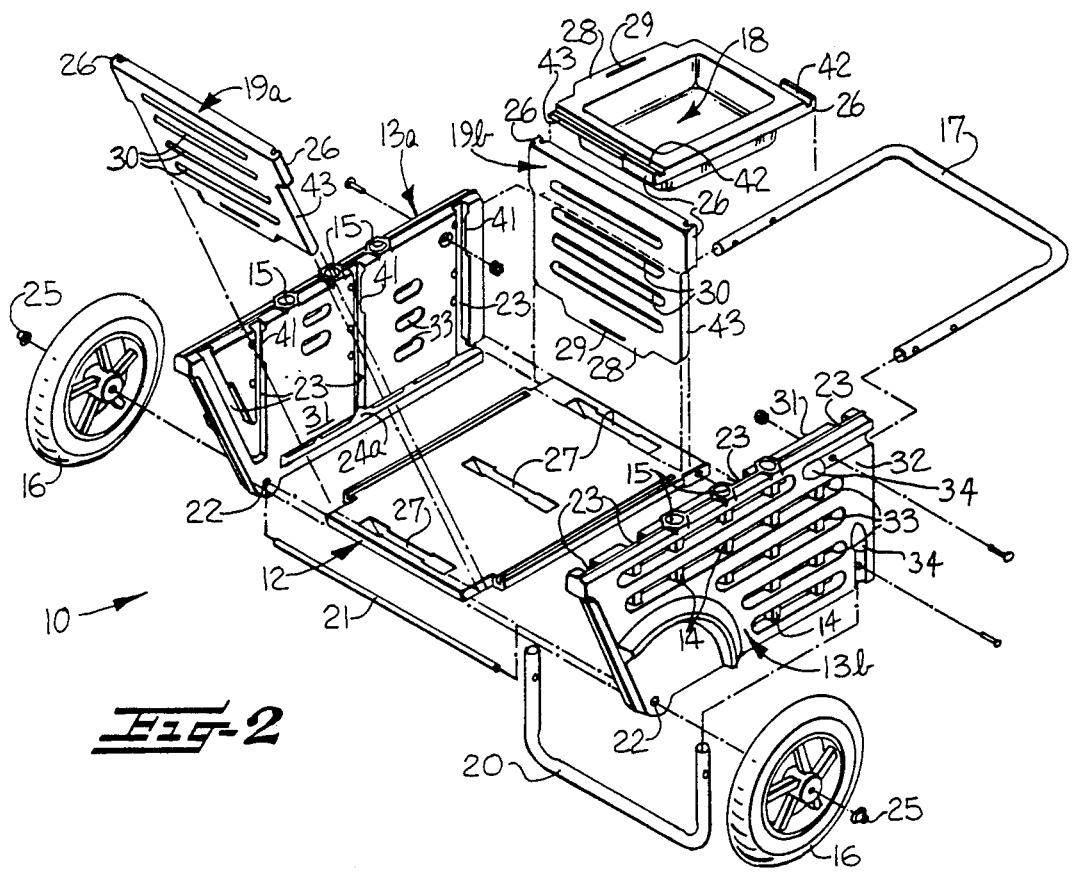
FIG. 2 is an exploded view of the portable wheeled cart in accordance with the present invention.

Referring now to FIG. 2, an exploded view of the portable wheeled cart 10 according to the present invention is shown. As shown, the wheels 16 are connected to the body by an axle 21 inserted through small holes 22 in the sidewalls 13a, 13b. The axle 21 extends beneath the bottom wall 12 when the sectional pieces of the cart 10 are connected together Also provided are a plurality of spaced-apart pairs of opposing generally vertically arranged grooves 23. These grooves are preferably integral with the innermost faces of the sidewalls 13a, 13b. Each of the connecting walls 19a, 19b and tray 18 have edge members 26 adapted to be received in any of the pairs of opposing grooves 23 and slidably connected thereto. Opposing slots 24a and 24b are provided for receiving the leftmost and rightmost edges of the bottom wall 12. The wheels 16, axle 21 and capping nuts 25, together with the rear rest support 20 and handle 17 connected to the sidewalls 13a, 13b using conventional techniques, maintain the sidewalls and bottom wall 12 in fixed relation and hold the cart together. For added strength, a bulging termination cap 34 is provided integral with the sidewalls for aiding in preventing the movement and rotation of the rear rest support 20 and handle 17, with respect to the sidewalls, during use.

The bottom wall 12 also includes a series of spaced-apart grooves 27 for matingly receiving the connecting wall and tray tongue members 28. The connecting wall and tray tongue members 28 have releasable locking portions 29 shown as raised ribs that cooperate with portions of the spaced-apart grooves 27 to thereby maintain the connecting walls 19a, 19b and tray 18 in their respective pair of opposing grooves 23 in the absence of an upwardly directed force being applied to the connecting wall or tray by a user.

In the preferred embodiment, the body 11 including the bottom wall 12, the sidewalls 13a, 13b, the connecting walls 19a, 19b and tray 18 are formed of double-walled plastic material. For added strength and rigidity, slots 30 are formed in connecting walls 19a, 19b using conventional blow-molding techniques. Using similar techniques, the preferred double-walled sidewalls 13a, 13b include inner and outer wall portions 31 and 32, respectively. Moreover, for providing added strength and rigidity and preventing lateral movement of the handle of yard tools received in passageways 14 through access openings 15, relatively short segments 33 of the inner wall and outer wall portions 31 and 32, respectively, are recessed inwardly towards each other. These recessed segments also aid in defining the first plurality of passageways 14, with access openings 15 along the uppermost edges, and a second plurality of passageways 35, with access openings 15' along the rearmost edges of the respective sidewalls. Preferably, the first and second plurality of passageways have longitudinal axes in substantially orthogonal relation to each other.

Referring now to FIG. 3, a front perspective view of the present invention environmentally illustrating the ease of transporting lawn and garden tools wherein elongate handles of yard tools (dotted lines) are shown received in the first plurality of passageways 14 is provided. Upper frontal portions of sidewalls 13a, 13b include forwardly projecting portions 36 for engaging the ground when the body 11 is rotated about the wheel means to form a vertically upright cart as shown by the perspective view of FIG. 4.

As shown in FIG. 4, the access openings 15' for the second plurality of passageways 35 are formed along the rearmost edges of sidewalls 13a, 13b (i.e., the uppermost edges when the cart is upright). Here again, the dotted lines show the elongate handles of the yard tools extending upwardly from the access openings 15'. The tray 18 is also shown in the uppermost position and the connecting walls 19a, 19b are shown serving as shelves for holding and storing lawn and garden supplies. The tray 18 and connecting walls 19a, 19b are readily interchangeable merely by applying a force to the respective wall or tray in a direction away from the bottom wall 12 to thereby remove the wall or tray and interchanging it with another, similarly removed.

Referring now to FIG. 5, a rear perspective view of the cart 10 in an upright position is shown with the tray 18 in the uppermost location. As described above in reference to FIG. 2, the axle 21 extends between the sidewalls 13a, 13b, as shown. In the preferred design, the bottom wall 12 is also formed of double-walled plastic wherein segments 38 of the bottom surface 37 are recessed to provide greater rigidity and strength to the bottom wall 12.

FIG. 6 depicts a horizontal cross-sectional representation of the cart 10 taken along line 6—6 of FIG. 1. In particular, releasable locking portions 39 illustrated as horizontal ribs are shown extending into the spaced-apart grooves 27. These portions 39 cooperate with the releasable locking portions 29 of the connecting walls 19a, 19b and tray 18 to thereby hold the walls and tray in their respective pair of opposing grooves. The double-walled construction of the sidewalls showing the inner wall portion 31 and outer wall portion 32 can be more readily understood with reference to this cross-sectional view. In particular, dotted lines 40 show the position of the access holes 15 with respect to the first plurality of passageways 14. The repossessed segments 33, are also shown generally defining the lateral extent of the passageways formed between the inner and outer wall portions 31 and 32, respectively.

Referring now to FIG. 7, a cross-sectional view taken along line 7—7 of FIG. 6 is shown. In particular, a cross-sectional view of the cooperating locking portions 29, 39, is shown in greater detail. The forwardmost connecting wall 19a is shown positioned in the forwardmost pair of opposing grooves 23. A similar view is also shown in FIG. 8, wherein the forwardmost connecting wall 19a is positioned in the next forwardmost pair of opposing grooves 23 and is vertically upright with respect to the bottom wall 12.

Referring now to FIG. 9, a cross-sectional view take along line 9—9 of FIG. 6 is shown. In particular, a cross-sectional view of the cooperating locking portions 29, 39, for the connecting wall 19b and rearmost spaced-apart groove 27 is shown. These cooperating locking portions shown as raised ribs help to maintain each connecting wall or tray in its respective pair of opposing grooves 23.

Referring now to FIG. 10, a sectional view of the cart in an upright position, taken along line 10—10 of FIG. 5, is shown particularly illustrating the double-walled construction of the bottom wall 12, connecting walls 19a, 19b (arranged in the lowermost shelf positions) and tray 18 (in the uppermost position).

FIGS. 11-13 illustrate the slidable connection between the sidewall 13b and connecting wall 19a taken at various points along the groove 23. In particular, FIG. 11 shows the slidable connection as it appears when viewed along line 11—11 of FIG. 10, wherein the edge member 26 is received within the sidewall groove 23. The edge member 26 further includes a connecting groove 42 held in place by a sidewall connecting tab 41. The slidable connection is further illustrated in cross-section in FIG. 12; the cross-sectional reference is line 12—12 of FIG. 10. When viewed along line 13—13 of FIG. 10, the sidewall groove 23 is shallower to receive the edge groove 43 of the connecting wall 19a. In the preferred embodiment, each of the connecting walls and tray are similarly slidably connected to the sidewalls 13a, 13b.

Referring now to FIG. 14, a fragmented view of the connection between the handle 17 and sidewall 13a is provided wherein conventional hardware (nuts, bolts, washers) is used to secure the handle 17 to the body 11. Referring now to FIG. 15, a fragmented view of the junction between the bottom wall 12, sidewall 13b and connecting wall 19b is provided wherein a portion of the bottom wall is recessed to provide a space 44 for attaching a bolt, nut and washer to thereby secure the rear rest support 20 to the sidewalls 13a, 13b and fixably secure the bottom wall 12 in opposing slots 24a, 24b. Upon removal of the bolt, the bottom wall 12 can be slidably removed for repair, maintenance, etc.

Referring now to FIG. 16, a horizontal sectional view of the portable wheeled cart in the upright position, taken along line 16—16 in FIG. 10, is provided. Line 16—16 cuts through connecting wall 19b exposing the slots 30. In addition, the dotted lines 45 show the position of the access holes 15' with respect to the second plurality of passageways 35.

In the drawings and specification, there has been disclosed a preferred embodiment of the invention and, although specific terms are employed, they are used in a generic and descriptive sense only and not for purposes of limitation, the scope of the invention being set forth in the following claims.

That which is claimed is:

1. A portable wheeled cart for work in yard and garden, comprising:
   a body having a bottom wall and a pair of double-walled integrally molded opposing sidewalls which have inner and outer wall portions extending upwardly from said bottom wall, said sidewalls having a plurality of interiorly located open-ended elongate passageways, defined between said inner and outer wall portions, for receiving handles of yard tools to facilitate carrying same in the cart;
   wheel means connected to said body for permitting rolling movement of the cart about the yard and garden; and
   a handle connected to said body for facilitating the grasping and moving of the cart.

2. A portable wheeled cart for work in yard and garden, comprising:
   a body having a bottom wall and a pair of opposing sidewalls extending upwardly from said bottom wall, said sidewalls having a plurality of open-ended passageways defined therein for receiving handles of yard tools to facilitate carrying same in the cart;
   wheel means connected to said body for permitting rolling movement of the cart about the yard and garden;
   a handle connected to said body for facilitating the grasping and moving of the cart;
   wherein said opposing sidewalls have a plurality of spaced-apart pairs of opposing generally vertically arranged grooves integral with the innermost faces of said sidewalls; and
   a plurality of connecting walls slidably positioned in said pairs of opposing grooves, wherein each of said connecting walls is rearrangeable with another in each of said pairs of opposing grooves.

3. The portable wheeled cart of claim 2, wherein a forwardmost pair of said plurality of opposing grooves extends upwardly and forwardly from said bottom wall adjacent the frontmost edges of said sidewalls; and wherein one of said connecting walls, positioned in said forwardmost pair of opposing grooves, serves to provide a forwardly and upwardly sloping front wall to said body of the cart to facilitate the dumping and spreading of fungible lawn and garden supplies from the cart.

4. The portable wheeled cart of claim 2, wherein said connecting walls have tongue members projecting outwardly along their bottommost edge; and wherein said bottom wall has a series of spaced-apart grooves matingly receiving respective connecting wall tongue members.

5. The portable wheeled cart of claim 2, wherein said sidewalls comprise double-walled integrally molded plastic having inner and outer wall portions; and wherein said plurality of spaced-apart pairs of opposing grooves are integral with said inner wall portions.

6. The portable wheeled cart of claim 2, further including a ground engaging rear rest support connected to and extending downwardly from said body which together with said wheel means support said bottom wall in a substantially horizontal plane.

7. The portable wheeled cart of claim 4, wherein said connecting wall tongue members and said spaced-apart grooves have cooperating portions for releasably locking each connecting wall in its respective pair of opposing grooves, in the absence of an upwardly directed force being applied to the connecting wall by a user.

8. The portable wheeled cart of claim 4, wherein a forwardmost pair of said plurality of opposing grooves in said sidewalls extends forwardly and upwardly from said bottom wall's forwardmost spaced-apart groove at an angle diverging from the next adjacent pair of said plurality of opposing grooves; and wherein said forwardmost spaced-apart groove is adapted to receive a respective connecting wall in either the forwardmost pair or next adjacent pair of said plurality of opposing grooves.

9. The portable wheeled cart of claim 5, wherein said plurality of passageways in said sidewalls extend between the inner wall and outer wall portions of said double-walled integrally molded sidewalls.

10. The portable wheeled cart of claim 9, wherein said plurality of passageways further comprise a first plurality of passageways, substantially vertically arranged with respect to said bottom wall, with access openings along the uppermost edges of said sidewalls, and a second plurality of passageways with access openings along the rearmost edges of said sidewalls, wherein said first and said second plurality of passageways have longitudinal axes in substantially orthogonal relation to one another.

11. The portable wheeled cart of claim 10, wherein segments of said inner and outer wall portions of said double-walled plastic sidewalls are recessed inwardly towards each other for aiding in defining said passageways and preventing lateral movement of the handles of yard tools when received in said passageways.

12. The portable wheeled cart of claim 10, wherein upper frontal portions of said sidewalls have forwardly projecting portions for engaging the ground when said body is rotated about said wheel means to form a vertically upright cart, wherein in this position, said connecting walls serve as shelves and trays for holding and storing lawn and garden supplies and wherein said second plurality of passageways are now substantially vertically disposed to facilitate the storage of yard tools therein.

13. A portable wheeled cart for work in yard and garden, comprising:
   a body having a bottom wall, a pair of opposing sidewalls extending upwardly from said bottom wall, said sidewalls having a plurality of open-ended passageways defined therein for receiving handles of yard tools to facilitate carrying same in the cart, and a plurality of spaced-apart pairs of opposing generally vertically arranged grooves integral with the innermost faces of said sidewalls;

a plurality of connecting walls positioned in said pairs of opposing grooves, wherein each of said connecting walls is rearrangeable with another in each of said pairs of opposing grooves;

wheel means connected to said body for permitting rolling movement of said cart about the yard and garden;

a ground engaging rear rest support connected to and extending downwardly from said body which together with said wheel means support said bottom wall in a substantially horizontal plane; and a handle connected to said body for facilitating the grasping and moving of the cart.

14. The portable wheeled cart of claim 13, wherein said sidewalls comprise double-walled integrally molded plastic having inner and outer wall portions; and wherein said pairs of opposing grooves are integral with said inner wall portion.

15. The portable wheeled cart of claim 14, wherein said plurality of passageways in said sidewalls further comprise a first plurality of passageways substantially vertically arranged with respect to said bottom wall, with access openings along the uppermost edges of said sidewalls, and a second plurality of passageways with access openings along the rearmost edges of said sidewalls, wherein said first and said second plurality of passageways have longitudinal axes in substantially orthogonal relation to each other.

16. A portable wheeled cart for work in yard and garden, comprising:

a double-walled integrally molded body having a bottom wall, a pair of opposing sidewalls having inner and outer wall portions extending upwardly from said bottom wall, wherein relatively short segments of said inner and outer wall portions are recessed inwardly towards each other for providing rigidity and strength to said sidewalls and defining a first and second plurality of passageways having respective access openings along the uppermost and rearmost edges of said sidewalls for receiving handles of yard tools to facilitate carrying same in the cart, and a plurality of spaced-apart pairs of opposing generally vertically arranged grooves integral with the inner wall portions of said sidewalls;

a plurality of connecting walls slidably positioned in said pairs of opposing grooves, wherein each of said connecting walls is rearrangeable with another in each of said pairs of opposing grooves;

wheel means connected to said body for permitting rolling movement of the cart about the yard and garden;

a ground engaging rear rest support connected to and extending downwardly from said body which together with said wheel means support said bottom wall in a substantially horizontal plane; and a handle connected to said body for facilitating the grasping and moving of the cart.

17. The portable wheeled cart of claim 16, wherein said connecting walls have tongue members projecting outwardly along their bottommost edge; wherein said bottom wall has a series of spaced-apart grooves matingly receiving respective connecting wall tongue members; and wherein said connecting wall tongue members and said spaced-apart grooves have cooperating portions for releasably locking each connecting wall in its respective pair of opposing grooves, in the absence of an upwardly directed force being applied to the connecting wall by a user.

18. The portable wheeled cart of claim 17, wherein upper frontal portions of said sidewalls have forwardly projecting portions for engaging the ground when said body is rotated about said wheel means to form a vertically upright cart, and wherein in this upright position said connecting walls serve as shelves and trays for holding and storing lawn and garden supplies and said second plurality of passageways are generally vertically disposed to facilitate the storage of yard tools therein.

19. The portable wheeled cart of claim 18, wherein said sidewalls further comprise bulging termination caps integral with said sidewalls for aiding in preventing the movement and rotation of said ground engaging rear rest support and said handle, with respect to said sidewalls, during use.

* * * * *